United States Patent
Zeira et al.

(10) Patent No.: US 8,644,864 B2
(45) Date of Patent: Feb. 4, 2014

(54) METHOD AND APPARATUS FOR PAGING IN MACHINE TO MACHINE OR MOBILE ASSISTED DEPLOYMENTS

(75) Inventors: Eldad M. Zeira, Huntington, NY (US); Gregory S. Sternberg, Mt. Laurel, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 207 days.

(21) Appl. No.: 13/347,424

(22) Filed: Jan. 10, 2012

(65) Prior Publication Data
US 2012/0178485 A1 Jul. 12, 2012

Related U.S. Application Data

(60) Provisional application No. 61/431,413, filed on Jan. 10, 2011, provisional application No. 61/524,948, filed on Aug. 18, 2011.

(51) Int. Cl.
*H04W 4/00* (2009.01)
*H04J 3/06* (2006.01)

(52) U.S. Cl.
USPC ............ 455/500; 370/331; 370/338; 370/503

(58) Field of Classification Search
USPC .......................... 370/331, 338, 503; 455/500
See application file for complete search history.

(56) References Cited

U.S. PATENT DOCUMENTS

| | | | | |
|---|---|---|---|---|
| 6,674,787 | B1 * | 1/2004 | Dick et al. ............ | 375/130 |
| 7,508,807 | B2 * | 3/2009 | Dick et al. ............ | 370/342 |
| 8,259,681 | B2 * | 9/2012 | Lee et al. ............. | 370/331 |
| 2004/0131033 | A1 * | 7/2004 | Dick et al. ............ | 370/335 |
| 2009/0017844 | A1 | 1/2009 | Li et al. | |
| 2009/0143072 | A1 | 6/2009 | Montojo et al. | |
| 2011/0103325 | A1 * | 5/2011 | Cho et al. ............. | 370/329 |
| 2012/0004003 | A1 * | 1/2012 | Shaheen et al. ........ | 455/509 |
| 2012/0115518 | A1 * | 5/2012 | Zeira et al. ........... | 455/500 |
| 2012/0231828 | A1 * | 9/2012 | Wang et al. ........... | 455/509 |
| 2012/0294218 | A1 * | 11/2012 | Lee et al. ............. | 370/311 |
| 2013/0115966 | A1 * | 5/2013 | Kang et al. ........... | 455/450 |

FOREIGN PATENT DOCUMENTS

EP 2 086 277 8/2009

OTHER PUBLICATIONS

Fang et al., "Management for M2M Devices," IEEE 802.16 Presentation Submission Template (Rev. 9.2), IEEE C802.16p-10/0039 (Jan. 7, 2011).
Wang et al., "HR-MS Neighbor Discovery in 802.16n," IEEE 802.16 Broadband Wireless Access Working Group, IEEE C802.16n-11/0021r1 (Mar. 6, 2011).
Draft Amendment to IEEE Standard for Local and metropolitan area networks; Part 16: Air Interface for Broadband Wireless Access Systems, IEEE P802.16m/D11 (Jan. 2011).

\* cited by examiner

*Primary Examiner* — Bobbak Safaipour
(74) *Attorney, Agent, or Firm* — Volpe and Koenig, P.C.

(57) ABSTRACT

A method and apparatus may be used to perform WTRU-WTRU paging in wireless communications. For example, a wireless transmit/receive unit (WTRU) may be configured to page another WTRU. In this example, the paging WTRU may receive a first message that indicates a group identification (ID). The WTRU may receive a second message that may include an indicator that indicates one or more other WTRUs that the paging WTRU may page. If the received indicator matches a paging indicator of the paging WTRU, the paging WTRU may transmit an access signal to one or more other WTRUs. The paging indicator of the paging WTRU may be predetermined, and may be received in a configuration message from a base station (BS). The first message may be a secondary advanced (SA)-preamble.

19 Claims, 9 Drawing Sheets

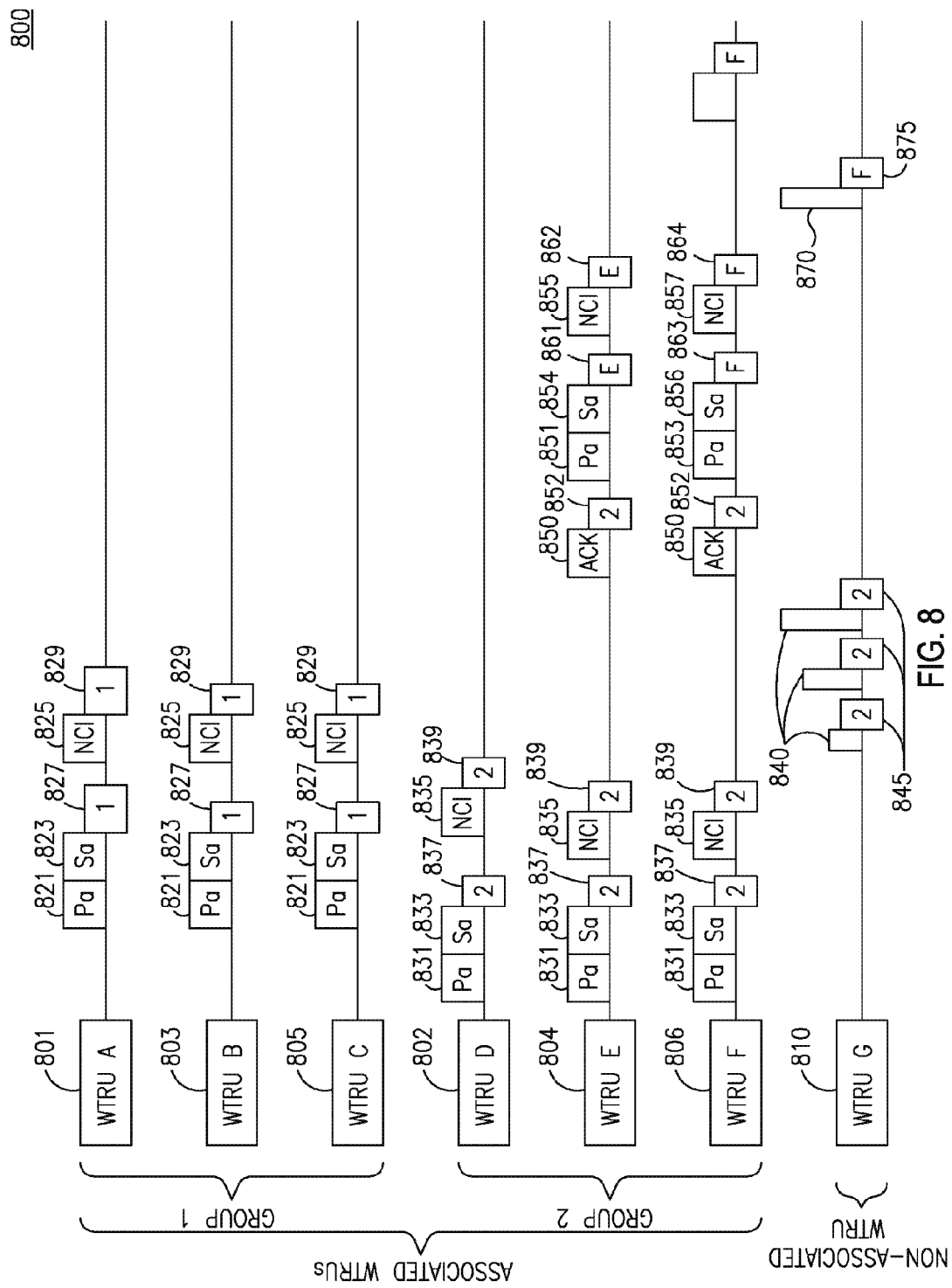

METHOD AND APPARATUS FOR PAGING IN MACHINE TO MACHINE OR MOBILE ASSISTED DEPLOYMENTS

CROSS REFERENCE TO RELATED APPLICATIONS

This application claims the benefit of U.S. Provisional Application No. 61/431,413 filed on Jan. 10, 2011, and U.S. Provisional Application No. 61/524,948 filed on Aug. 18, 2011, the contents of which are hereby incorporated by reference.

BACKGROUND

Machine to machine (M2M) or machine type (MTC) communications may be used synonymously, and may be defined as communications initiated by the machine, to communicate with either other machines or with humans. Applicable network topologies may include wireless transmit/receive unit (WTRU)-WTRU direct communications which may be used for coverage extension. WTRU-WTRU direct communications may be referred to as peer-to-peer communications. These communications may be used to increase network robustness by providing an alternative path for connectivity.

In typical cellular protocols, a WTRU that is either in idle, disconnected or dormant state, may monitor the base station (BS) or relay station (RS) infrequently to determine if the WTRU needs to listen for a data transmission. This process may be referred to as paging. In order to minimize battery consumption and increase range, paging signals may be designed to be short.

M2M networks as defined above may differ from typical cellular networks in two ways. First, some subscribers may not be configured to decode, or may be out of range of BS or RS transmissions. These subscribers, however, must still be reached. Second, the number of subscribers in the cell could be very large.

Typical M2M networks do not support paging for a group of subscriber stations. Accordingly, it would be desirable to have a method and apparatus to support paging for group subscriber stations in M2M networks. It would also be desirable to extend the page to a WTRU that is out of the range of the BS or RS. It would also be desirable to reduce the relative overhead created by MAC messaging for small amounts of data at a time. This overhead may be, along with other signaling, associated with paging.

SUMMARY

A method and apparatus may be used to perform WTRU-WTRU paging in wireless communications. For example, a wireless transmit/receive unit (WTRU) may be configured to page another WTRU. In this example, the paging WTRU may receive a first message that indicates a group identification (ID). The WTRU may receive a second message that may include an indicator that indicates one or more other WTRUs that the paging WTRU may page. If the received indicator matches a paging indicator of the paging WTRU, the paging WTRU may transmit an access signal to one or more other WTRUs. The paging indicator of the paging WTRU may be predetermined, and may be received in a configuration message from a base station (BS). The first message may be a secondary advanced (SA)-preamble.

A WTRU may be configured to receive a page from another WTRU. For example, the paged WTRU may detect one or more of its assigned paging indicators and transmit a message to one or more other WTRUs. The one or more other WTRUs may belong to a group, and the transmitted message may indicate the group. The one or more assigned paging indicators may have been assigned by a BS at an earlier time via a configuration message. The paged WTRU may use a transmit power ramp up procedure for the transmitted message until a response is received.

In response to the transmitted message, the paged WTRU may receive an ACK from one or more other WTRUs. The ACK may be a group-based ACK. The ACK may be followed by a plurality of messages associated with a WTRU (WTRU-specific messages). The plurality of WTRU-specific messages may each include an indicator that indicates a WTRU ID. The paged WTRU may chose to associate with one of the responding WTRUs. The choice may be based on a received indicator. The paged WTRU may transmit a network access signal, and may include an indicator that indicates the chosen WTRU ID.

BRIEF DESCRIPTION OF THE DRAWINGS

A more detailed understanding may be had from the following description, given by way of example in conjunction with the accompanying drawings wherein:

FIG. 8 is a diagram of another example group paging method.

DETAILED DESCRIPTION

When referred to hereafter, the terminology "wireless transmit/receive unit (WTRU)" may include but is not limited to a user equipment (UE), a mobile station (MS), and advanced mobile station (AMS), high reliability (HR)-MS, a fixed or mobile subscriber unit, a pager, a cellular telephone, a personal digital assistant (PDA), a computer, or any other type of user device capable of operating in a wireless environment. A WTRU may be a non-infrastructure node. When referred to hereafter, the terminology "seeking WTRU" includes but is not limited to a WTRU attempting to discover and associate with peers. When referred to hereafter, the terminology "discoverable WTRU" includes but is not limited to a WTRU that may be discovered by the seeking WTRU.

When referred to hereafter, the terminology "base station (BS)" may include but is not limited to a Node-B, an advanced base station (ABS), an HR-BS, a site controller, an access point (AP), or any other type of interfacing device capable of operating in a wireless environment.

Figure 1A:
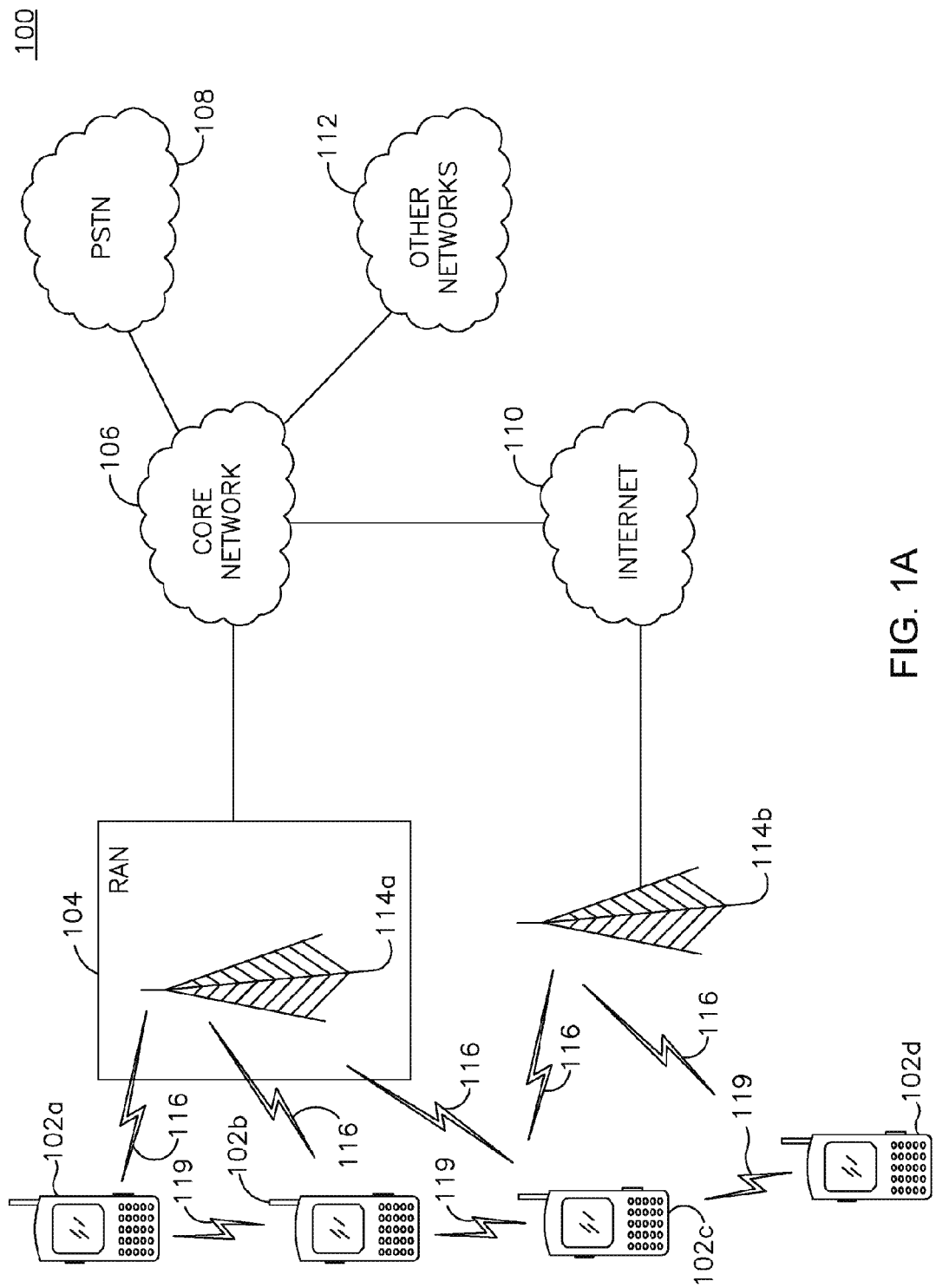
FIG. 1A is a system diagram of an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations (BSs), networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT). Each of WTRUs 102a, 102b, 102c, and 102d may be configured to page one or more other WTRUs using paging messages 119.

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, prepaid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
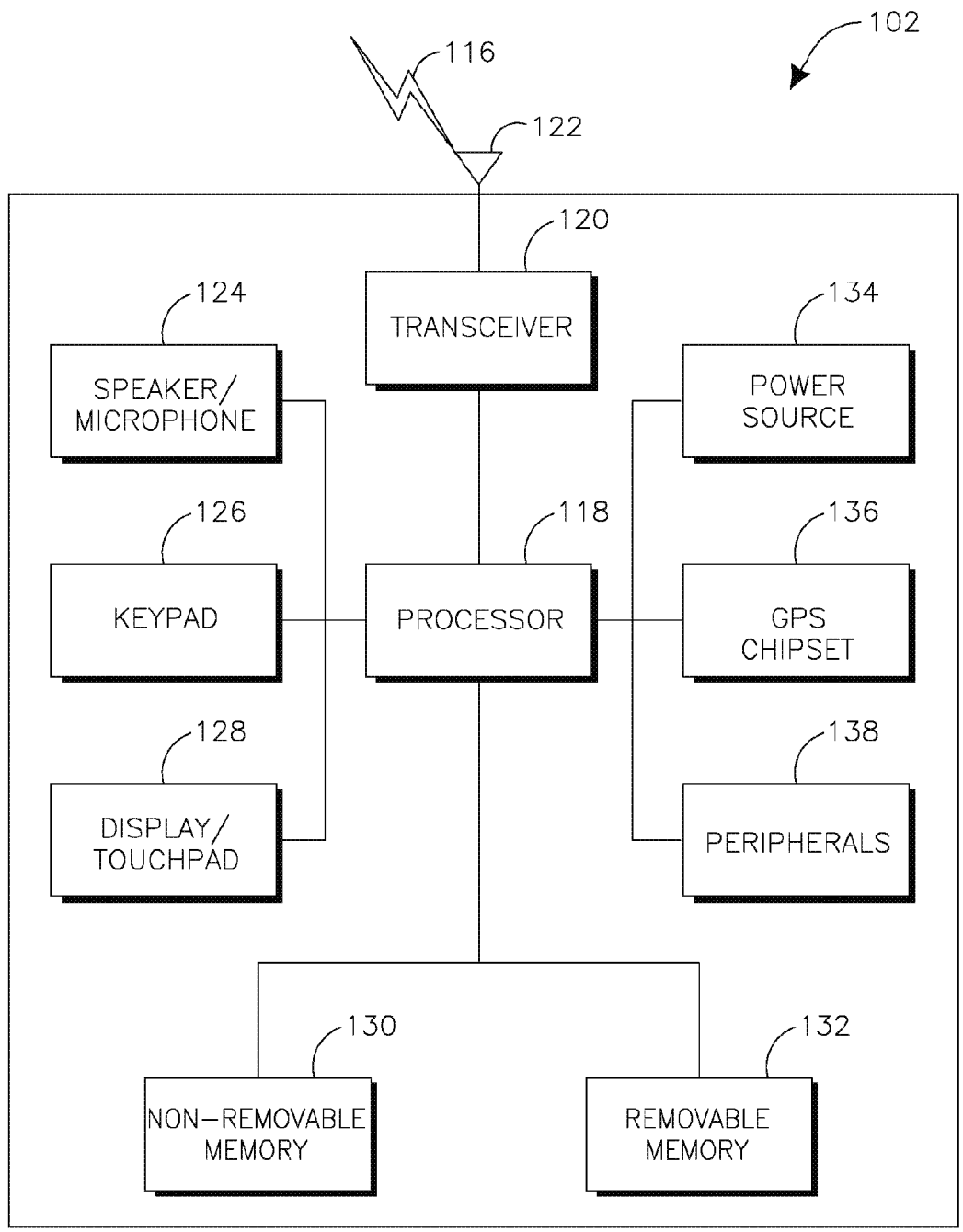
FIG. 1B is a system diagram of an example wireless transmit/receive unit (WTRU) that may be used within the communications system illustrated in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, ITV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
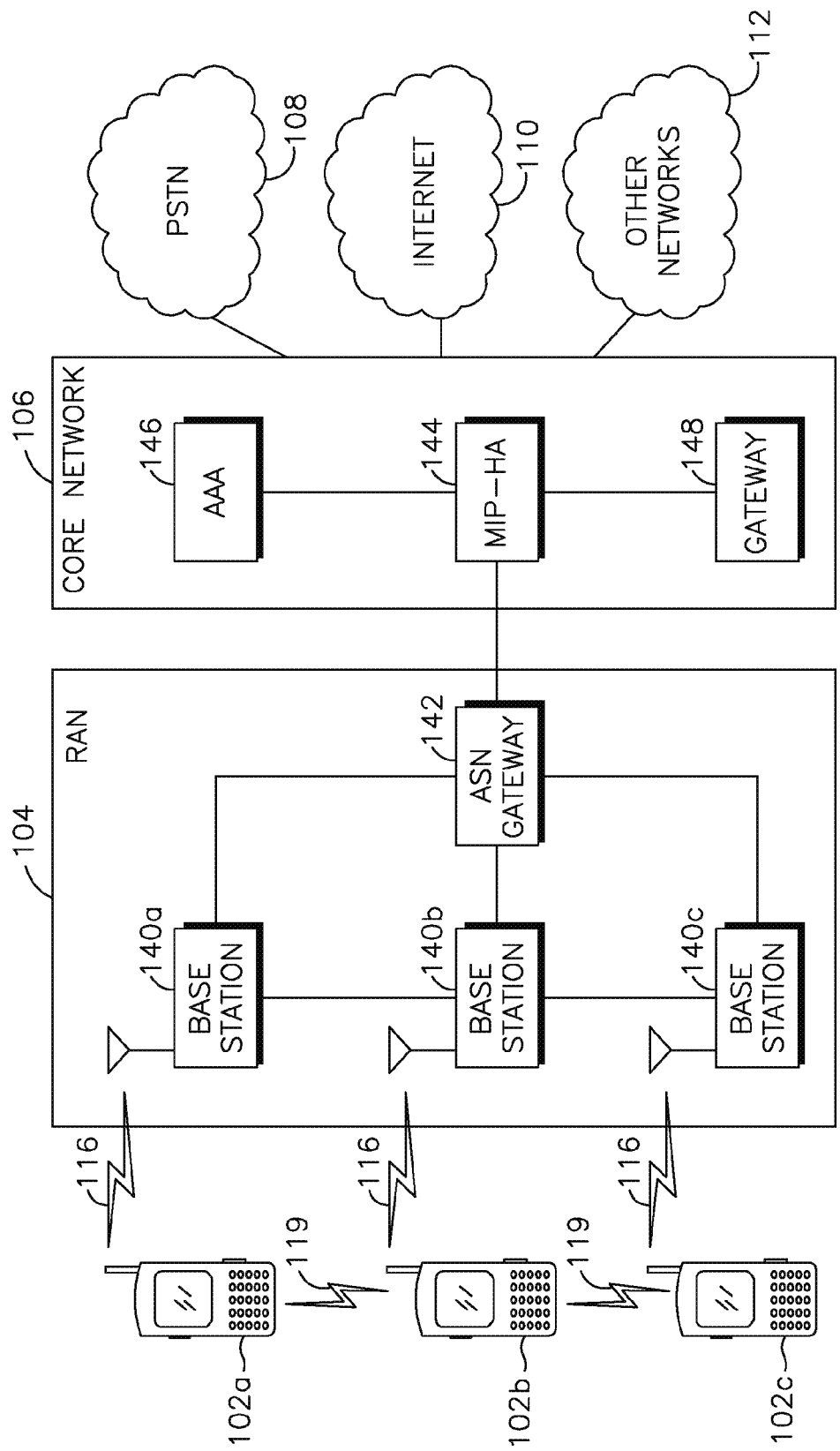
FIG. 1C is a system diagram of an example radio access network and an example core network that may be used within the communications system illustrated in FIG. 1A.

FIG. 1C shows an example RAN 104 and an example core network 106 that may be used within the communications system 100 shown in FIG. 1A. The RAN 104 may be an access service network (ASN) that employs IEEE 802.16 radio technology to communicate with the WTRUs 102*a*, 102*b*, 102*c* over the air interface 116.

As shown in FIG. 1C, the RAN 104 may include base stations 140*a*, 140*b*, 140*c*, and an ASN gateway 142, though it will be appreciated that the RAN 104 may include any number of base stations and ASN gateways while remaining consistent with an embodiment. The base stations 140*a*, 140*b*, 140*c* may each be associated with a particular cell (not shown) in the RAN 104 and may each include one or more transceivers for communicating with the WTRUs 102*a*, 102*b*, 102*c* over the air interface 116. In one embodiment, the base stations 140*a*, 140*b*, 140*c* may implement MIMO technology. Thus, the base station 140*a*, for example, may use multiple antennas to transmit wireless signals to, and receive wireless signals from, the WTRU 102*a*. The base stations 140*a*, 140*b*, 140*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102*a*, 102*b*, 102*c* and the RAN 104 may implement the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be used for authentication, authorization, IP host configuration management, and/or mobility management. Each of WTRUs 102*a*, 102*b*, and 102*c*, may be configured to page one or more other WTRUs using paging messages 119.

The communication link between each of the base stations 140*a*, 140*b*, 140*c* may include protocols for facilitating WTRU handovers and the transfer of data between base stations. The communication link between the base stations 140*a*, 140*b*, 140*c* and the ASN gateway 142 may include protocols for facilitating mobility management based on mobility events associated with each of the WTRUs 102*a*, 102*b*, 102*c*.

As shown in FIG. 1C, the RAN 104 may be connected to the core network 106. The communication link between the RAN 104 and the core network 106 may include protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102*a*, 102*b*, 102*c* to roam between different ASNs and/or different core networks. The MIP-HA 144 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 146 may be responsible for user authentication and for supporting user services. The gateway 148 may facilitate interworking with other networks. For example, the gateway 148 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 148 may provide the WTRUs 102*a*, 102*b*, 102*c* with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may include protocols for coordinating the mobility of the WTRUs 102*a*, 102*b*, 102*c* between the RAN 104 and the other ASNs. The communication link between the core network 106 and the other core networks may include protocols for facilitating interworking between home core networks and visited core networks.

Various non-traditional applications for cellular networks may be considered that involve communications not initiated by humans and/or may not be strictly hierarchical topologies, such as machine-to-machine (M2M) communications or machine type communications (MTC). The M2M communications or MTC may be defined as communications initiated by a machine to communicate with either other machines or humans. The methods described herein may be applicable to MTC communications, as well as other types of communications.

Network topologies which include WTRU-to-WTRU direct communications may be used for coverage extension, throughput improvement, and the like. These network topologies may also significantly increase network robustness by providing an alternative path for connectivity, by discovering nodes when necessary. However, the WTRUs may not be mobile at all, or have a very low mobility.

Changes to the traditional behavior of a WTRU with respect to the way it discovers and establishes a link with the network may be necessary, including the functionality of node discovery, routing, association and bandwidth request, as appropriate. A WTRU, possibly assisted by the network, may identify and maintain an association with a set of other WTRUs to either assist in relaying data to/from the network, or communicate data locally without data flows to/from a BS. Client collaboration, relaying and WTRU-to-WTRU communication with or without a network may be implemented in any type of wireless communication systems including, but not limited to, IEEE 802.16 and any amendments thereof, long term evolution (LTE), universal mobile telecommunication system (UMTS), and the like.

In an 802.16m example, it may be assumed that the WTRU has associated with the network prior to paging. In this example, the WTRU may enter an IDLE state before it receives paging parameters. Paging may use a deregistration indicator (DI). The paging function may be updated in a ranging procedure using a Ranging Response (RNG-RSP) medium access control (MAC) message.

Paging may be performed using a two sided grouping. For example, a BS may be assigned to one or more groups, and a WTRU may be assigned to multiple groups. The number of groups may be limited to 4. Different paging cycles and/or offsets may be used within a group. One of the WTRU groups may be designated as a primary group. The primary group may have preference for detection, and may, for example have the smallest offset. Paging may be performed using primary and secondary groups, and there may be no need to coordinate busy times. A location update procedure may be triggered if there is no group present.

During paging unavailable intervals, the BS may not expect to be able to page the WTRU. The WTRU may use this time for battery savings or for making measurements. A re-synchronization and detection of superframe header (SFH) may be performed towards the end of a period to extract a superframe number to determine a paging time. New paging parameters may be signaled using an AAI-DREG-RSP message during an IDLE mode initiation and an AAI-RNG-RSP during a location update.

A broadcast paging message, for example, an AAI-PAG-ADV message, may be used to indicate the presence of DL traffic. The broadcast paging message may be used to poll for a location update, such as in ranging. The broadcast paging message may include an emergency alert. Multiple WTRUs may be identified in the broadcast paging message, therefore a true group may not exist. A paging message without a WTRU ID may indicate that the WTRU return to a sleep state. The broadcast paging message may be transmitted, for example, within a frame including defined by $N_{superframe}$ modulo PAGING_CYCLE==PAGING_OFFSET. The location within the frame may be signaled in an A-field map (A-MAP) IE, and may continue in the next frame. Paging by barred cells may be allowed, however network entry may be restricted to preferred BSs.

Operation during a paging listening interval may be based on a paging cycle and/or offset. Listening may be performed on a per superframe basis. The WTRU may synchronize on a PA-preamble and may decode a primary SFH (P-SFH). Paging ID information (PGID-Info) may be transmitted regardless of the presence of paging to any WTRU, and may signal which paging groups are supported by the BS. The PGID-Info may be transmitted at a predetermined location in the listening interval.

Machine to machine communications may involve a large number of devices, where some, but not all devices may be of low or no mobility. Data transmission may be infrequent and may tolerate relatively high latency. M2M devices may share the network with other types of devices.

Page groups may be used for the following reasons. Due to device mobility, device location may never be certain. Several BSs in the same area may be grouped together to cover the uncertainty. As M2M mobility may be fairly low, the need for large groups of BSs (and therefore a large group of WTRUs) may be reduced, but not eliminated. The WTRU may belong to several groups to support services with different latency requirements.

It may be assumed that there are a very large number of devices for each sector. Most of these devices, however, may be directly associated with the BS. Only a minority may need to be relayed by another WTRU. The average number of WTRUs that may need to be paged by any other WTRU is therefore small, however it is possible that some WTRUs may need to page more than one WTRU. In 802.16, for example, paging a WTRU may be represented by its Deregistration Information (DI). The DI for the WTRU may be 18 bits, for example. Paging as a whole, however, may require many more bits since paging within a few WTRUs require a large overhead. Note that while each paging WTRU may page only a few other WTRUs, there could potentially be many paging WTRUs in the cell. If paging is performed often, the impact of the overhead may be significant.

M2M cases may present the need to page a group of users, for example, devices of a similar type may be paged at the same time for a specific task. Due to the possibility of some device mobility, a long paging window and small coverage of a paging WTRU, there may be some uncertainty in the paging WTRU, for example, the WTRU may have changed location since a previous data exchange.

In one example of a Public Protection and Disaster Relief (PPDR) case, the WTRUs are not associated unless they need to communicate, and they may never be in an IDLE state. In this case, there is no need for paging. In another PPDR case, the WTRU may be associated with many other WTRUs, even when not in active communication, and paging may be used.

In an example for throughput enhancement, all the WTRUs may be associated directly with the BS and may be paged by the BS. In M2M applications, three types of paging may be considered: 1) individual paging with a known WTRU location, 2) group paging, and 3) individual paging with an unknown WTRU location. Individual paging may be used for paging a specific WTRU for a specific purpose. The attachment point of the WTRU to the network may be known to a high degree of accuracy. Accordingly, the location of the WTRU may be assumed to have not changed significantly from the time of last communication with it. If the WTRU was recently directly attached to a BS, then it may now be in the service area of a small enough group of base stations adjacent to the original. If the WTRU was recently attached through a paging WTRU, then it may now be within range of a small group of WTRUs adjacent to it.

Group paging may be used for paging a group of WTRUs to perform a specific function. Examples of a specific function may include, 1) network access of a group of WTRUs, for example, in order to perform further communications, 2) ranging for a location update, and 3) reception of data in broadcast mode, for example in Smart Grid applications, some or all smart meters may be paged at the same time to provide new operational parameters.

Individual paging with an unknown location may be used when the location of the WTRU is not known. There may be several mechanisms to perform that function, for example, a paged WTRU may be instructed to range for a location update. As a result, the location of the WTRU may be known, and the BS may use the opportunity to transmit data to the WTRU. Alternatively, a paged WTRU may be instructed to enter the network.

Paging may be performed on a group or on an individual basis. Paging may be transmitted from an individual BS or from a group of BSs. Paging may also be transmitted from an individual paging WTRU or from a group of paging WTRUs. The latter may increase the detection probability, and may overcome the location uncertainty of the paged WTRU. A cause may be embedded in the paging signal, and may provide an efficient signaling mechanism. If paging is used to indicate a broadcast transmission, then the information required to access the broadcast transmission may be included in the paging signal.

Figure 2:
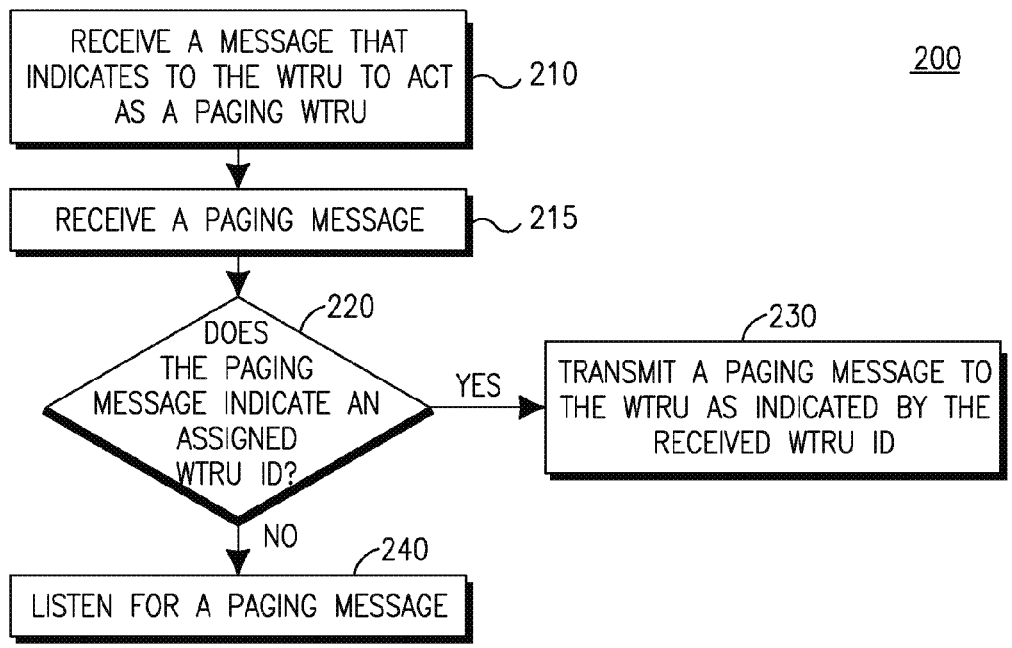
FIG. 2 is a flow diagram of an example method for performing individual paging with a known WTRU location.

For the following examples, it may be assumed that the paged WTRU has maintained or re-acquired downlink (DL) synchronization, and has updated its system information sufficiently to decode paging messages or waveforms. FIG. 2 is a flow diagram of an example method 200 for performing individual paging with a known WTRU location by extending the transmission of a paging signal to reach a WTRU that cannot decode the BS transmissions. In this example, the paged WTRU may or may not need to implement a new procedure in order to be paged by the paging WTRU.

Referring to FIG. 2, any WTRU, whether or not it has any WTRU associated with it, may receive 210 a message that indicates to the WTRU to act as a paging WTRU. The paging WTRU may be assigned a WTRU ID that indicates one or more paging groups for its paging function. These groups may or may not be the same as the paging groups used for its normal operation as a WTRU. The WTRU ID may indicate a single WTRU to page. A paged WTRU may be assigned one or more groups that may or may not be the same as the paging WTRU groups. The assignment may be made during an original association or at any other time. Periodicity and time offset may also be assigned during that time.

Paging messages to these paging groups may be transmitted at a known periodicity and time offset. The paging WTRU may receive a paging message 215, and if the paging message indicates a previously assigned WTRU ID 220 the paging WTRU may transmit a paging message to the WTRU as indicated by the received WTRU ID 230. Note that the received message may include multiple WTRU IDs, and the paging WTRU may transmit a paging message to each of the WTRUs indicated by the received WTRU IDs. If the received message does not indicate an assigned WTRU ID, the paging WTRU may continue to listen for a paging message 240.

A forwarding WTRU may have a WTRU attached to it. If a paging WTRU is also a forwarding WTRU, the attached WTRUs may be considered paged WTRUs. A mapping may be defined between the paging WTRU groups and the paged WTRU groups. The groups used for the paging message may be determined by this group mapping. A paging WTRU may be assigned resources and transmit by the BS power for its paging message.

In a multi-point transmission paging example, multiple paging WTRUs may be assigned at least one common paging group and one or more WTRU IDs to page. If, in addition, the same resources are assigned and the paging WTRUs are sufficiently synchronized, this example method may result in the transmission of the same waveform from multiple sources to increase the probability of paging success. BS paging messages may be CRC protected to prevent erroneous decoding if multiple WTRU transmit dissimilar information. Neither paging nor paged WTRU may be aware of the multi-point transmission.

Joint transmission of pages by multiple WTRUs may provide diversity gains over a single point transmission. Joint transmission of pages by multiple BSs may also provide diversity gains over a single point transmission. If joint transmission is performed by WTRUs along with the BSs, additional performance gains may be achieved. These diversity gains may combat short term fast multi-path fading as well as longer term shadow fading. If multiple WTRUs are used to transmit paging information, synchronization may be achieved by triggering the BS paging message to the paging WTRU.

Group paging may be performed by indicating a WTRU ID. by transmitting a deregistration identifier (DI), transmitting a group identifier (ID), or using WTRU IDs that may be separate from the DI and may be assigned by the network. As a result, it may not be necessary for the paged or paging WTRU to know whether an individual or a group are paged.

In the examples above, a group paging message may be transmitted for at least every single paged WTRU. Due to the uncertainty in WTRU location and the short range of WTRU-WTRU communications, the group paging message may need to be transmitted by many paging WTRUs. It may be possible to group WTRUs to be paged by location, however since grouping may be used for different services, group management may become difficult.

In order to reduce overhead in group paging, transmission of a group ID may be limited to the paging WTRU. Reception of the group ID by the paged WTRU may result in the WTRU transmitting a response signal with a possible transmit power ramp up procedure. Reception of the response signal by the paging WTRU may trigger the transmission of a full paging message.

Figure 3:
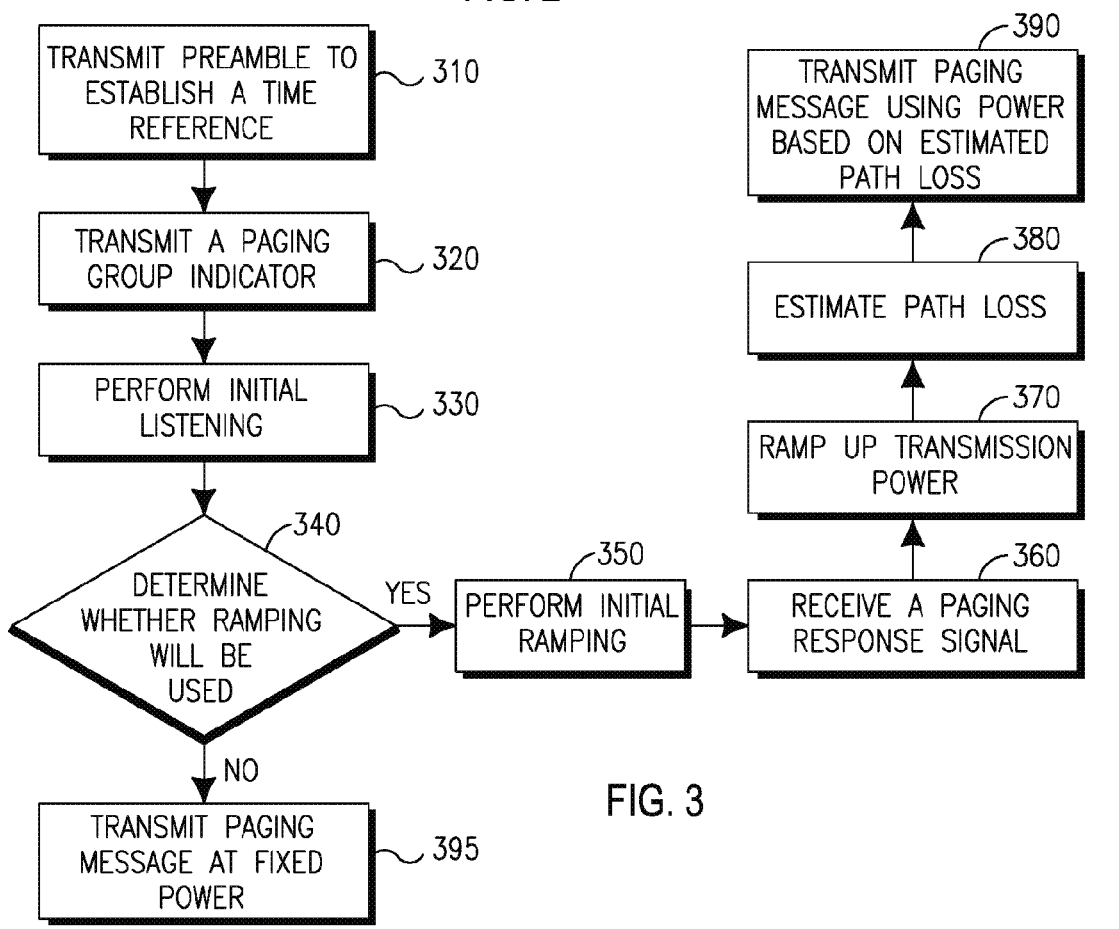
FIG. 3 is a flow diagram of an example method for reducing overhead in group paging.

FIG. 3 is a flow diagram of an example method 300 for reducing overhead in group paging. Referring to FIG. 3, the BS may transmit a preamble to establish a time reference 310. Establishing a time reference may be combined with network synchronization. In one example, a waveform similar to an 802.16m primary advanced preamble (PA-preamble) may be transmitted to establish network time and frequency synchronization. The PA-Preamble may define the superframe and its location within the superframe may be pre-determined and known.

A signal similar to an 802.16m secondary advanced preamble (SA-preamble) may be used to transmit a paging group indicator 320 using a selection of code and time/frequency resources. This may be possible as the SA-preamble, aside from being bandwidth dependent, may have a signature that may denote an ID. Reception of the SA-preamble may require an initial time synchronization obtained from the PA-preamble.

The timing of transmission of the SA-preamble used to convey paging may be fixed. Alternatively, the timing may be established during association or broadcast. The SA-preamble may be transmitted to a paged WTRU. The SA-preamble or another signal with similar capabilities may include information related to the type of paging device, for example a paging WTRU, and/or paging group information. The paging group may be indicated in the SA-preamble signature and timing element. The paging group may be expressed as a superframe offset relative to the superframe periodicity. A paging group indicator may be transmitted by any paging WTRU that has received a paging message. for one of the paged WTRUs of the group. The BS may arrange the paging messages such that the adjacent paging WTRU may transmit the same paging indicator at the same time.

The paged WTRU, in response to the paging message, may then transmit a signal indicating at least its presence. The paging WTRU may listen for the response signal during an initial listening phase 330. During the initial listening phase, listening resources may be known and may either be fixed or established during an initial association or by broadcast. The nature of the listening resources may depend on the information and waveform used. For example, the waveform may be a time domain waveform. In this example, the listening resources may listen during one or more listening time windows at times relative to the paging indicator superframe. Note that in this example, the added interference caused by the absence of a paged WTRU may be minimal.

The network in general, or the discoverable peer subscriber station (DPSS), also known here as the paging WTRU, may not know at this point that a paged WTRU is within range. The paging WTRU may obtain information regarding a paged WTRU that is within range. In addition, the paging WTRU may obtain a path loss estimate.

In order to minimize interference, the paged WTRU may start transmission at a low power. The paged WTRU may determine whether transmit power ramping will be used 340. If the paged WTRU determines that transmit power ramping will be used, the paged WTRU may perform an initial transmit power ramping 350.

To perform initial transmit power ramping, the paged WTRU may transmit a waveform to make itself known to the paging WTRU. In an example of multi-point transmission, the paged WTRU may transmit a waveform to multiple paging WTRUs. For example, 802.16m ranging preambles for either synchronized (S-RNG) or non-synchronized devices (NS-RNG) may be used. The paging WTRU may receive a paging response signal (PRS) from a paged WTRU 360, that may ramp up its transmission power during a listening window 370. The paged WTRU may ramp up its transmission power until a response is received or an allowed maximum is reached, in which case the transmit power ramping has failed. The initial power level and the transmit power ramping steps may be predetermined. The listening windows may be designed such that the paging WTRU knows how many transmit power ramping steps have occurred. With knowledge of the step size an initial power, the paging WTRU may estimate the path loss between itself and the paged WTRU 380. The paging WTRU may then transmit a paging message using a power based on the estimated path loss 390.

If the paged WTRU determines that transmit power ramping will not be used, the paged WTRU may use a fixed power that may be known to all devices 395. In this example, the PRS resources may be provided in terms of the paging indicator or time reference. For example, fixed resources may be used every n'th frame starting at a predetermined time after the paging indicator.

Not all paging WTRUs that have received the PRS are required to respond. Determining which paging WTRU responds may be based on information estimated either in a distributed manner or under direct BS control. For example, the paging-paged WTRU path loss estimate or other criterion may be used to determine the best paging WTRU. Note that the determination is not unique, and may result in more than one best paging WTRU.

In a centralized control mode, all the paging WTRUs that have received the PRS may send the path loss estimate information or other information to the BS. The BS may then decide which paging WTRU should respond based on the path loss estimate and other parameters, for example, capabilities of the forwarding WTRU and its own traffic load.

In one alternative, the responding paging WTRU may be determined by the BS in a distributed manner by predetermining a threshold on a function of the WTRU-BS and WTRU-WTRU path loss, and/or or other criterion. The function may be signaled by the BS, hard wired, or unspecified. Traffic load may be taking into account in a similar manner, for example, by a threshold on buffer occupancy.

Note that in itself the procedure does not absolutely guarantee that at least one WTRU will respond. A high degree of certainty may be achieved by BS control in the following manner. Every WTRU that has received a PRS may signal that indication to the BS. The BS may also know if the WTRU has responded and may adjust the threshold as necessary. Transmission power for the paging WTRU may be determined from the path loss estimate obtained above. The response of the paging WTRU may contain the paging messages, for example, as detailed in embodiments above.

In a WTRU/BS coordinated paging example, the BS may initially attempt to directly page the paged WTRU. If a response is not received within a specified time interval, the assistance of one or more paging WTRUs may be requested. Requesting the assistance of one or more paging WTRUs may improve the reliability of paging while minimizing the battery drain impact on the paging WTRU. Note that in this example, the attachment point may be either the BS or the paging WTRU. The protocol of which node initiates the first attempt, for example the WTRU, may be either established in advance as part of a network association or signaled to the paging WTRU by the BS at any other time. In this example, it is not assumed that the paged WTRU may not be able to receive pages from the BS. It may be assumed, however, that there may be a non-trivial probability of success. The probability of success may not be high enough to provide the desired reliability of successful paging.

An example autonomous paging WTRU triggering may be used in conjunction with the WTRU/BS coordinated paging example to reduce the signaling overhead. The paging WTRU may monitor the medium for paging responses to the BS pages. If no response is signaled, the WTRU may autonomously initiate assistance to the BS paging. While this may be autonomous, it may be coordinated with the BS in advance either at a network attachment time or any other time. While this example may reduce the signaling overhead, it may require that the paging WTRU be made aware of and monitor the common channel that may be used for paging response messages. This monitoring may offset the battery consumption advantage of the WTRU/BS coordinated paging example.

Reduced overhead multi-point paging may be used in conjunction with, for example, 802.16n discovery procedures. Multi-point paging may be used when one or more WTRUs are out of the coverage area of the BS, and they are moving in the cell such that there is some uncertainty regarding which associated WTRU may best page them.

Figure 4:
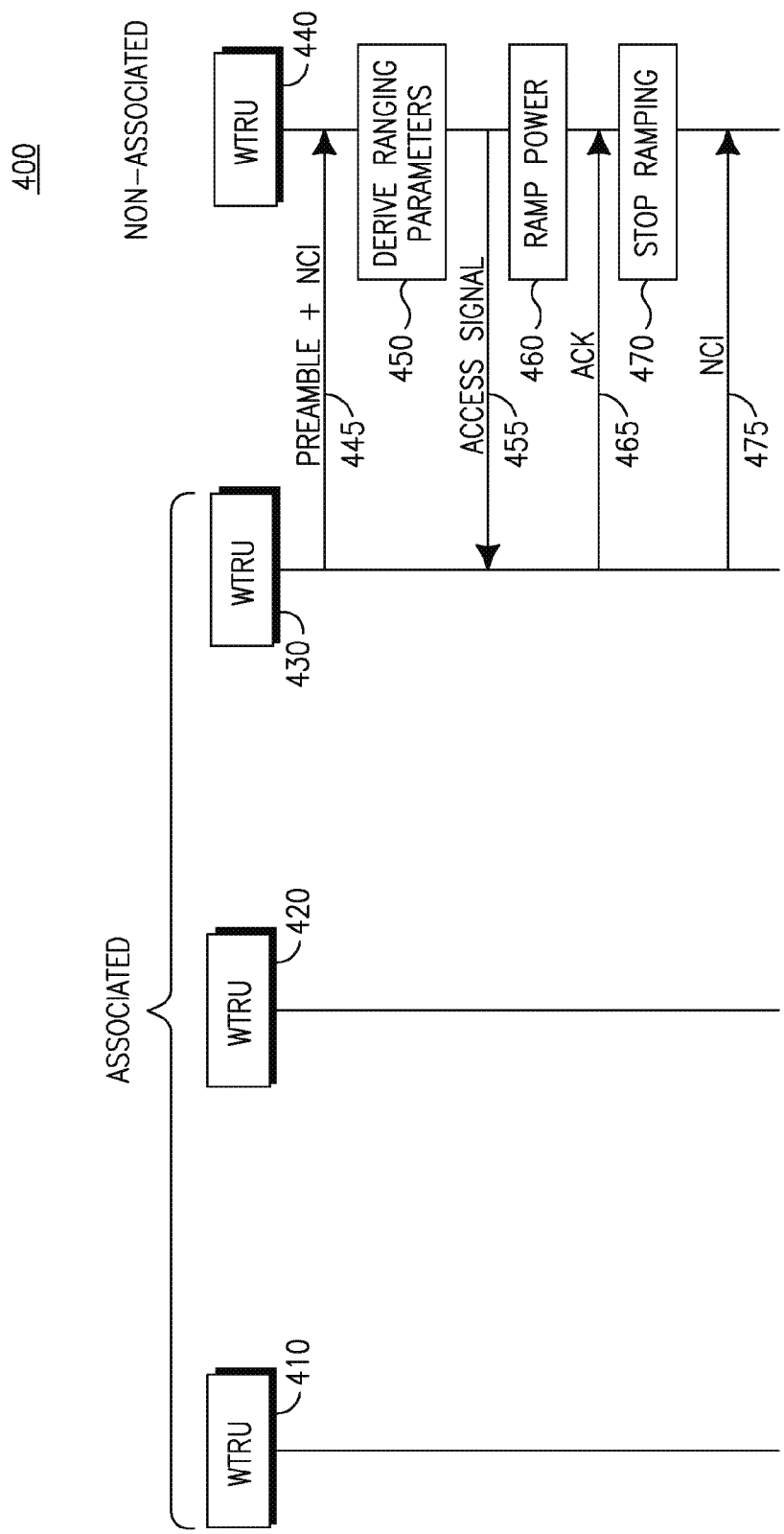
FIG. 4 is a flow diagram of example WTRU discovery procedure.

Paging for a unicast connection may be performed using the following example WTRU discovery procedure shown in FIG. 4. FIG. 4 shows a plurality of associated WTRUs 410-430, and one non-associated WTRU 440. One or more associated WTRUs may be designated as discoverable. These discoverable WTRUs may transmit preambles that contain information regarding network timing, bandwidth, one or more WTRU group IDs, and the type of device or its ownership, if applicable. The discoverable WTRUs may transmit a single preamble or a pair of primary and secondary preambles.

Referring to FIG. 4, WTRU 430 may transmit a preamble 445 and network connection information (NCI), using known resources or resources derived from the cell-ID in the SA-preamble for the NCI. The transmitted NCI may contain parameters required for initial access. The parameters may include, for example, resources, codes, etc. In this procedure, all discoverable WTRUs that are members of a group may transmit the same preamble and NCI on the same resources. This may result in the paged WTRU transmitting a group response to all WTRUs which have transmitted their ID as explained below.

The non-associated WTRU 440 may derive ranging parameters from the NCI. Alternatively, if the NCI is not used, the non-associated WTRU 440 may derive the ranging parameters 450 from the WTRU ID or group WTRU ID, as indicated by the preamble. The non-associated WTRU 440 may transmit an access signal 455 and ramp up its transmit power 460. The code for ranging may be specified in the NCI.

An associated WTRU, for example WTRU 430, may be designated as a paging WTRU, and may receive the access signal 455. If the received access signal 455 matches the access parameters of the paging WTRU 430 and crosses a threshold, the paging WTRU 430 may respond with an ACK 465. Upon receiving the ACK 465, the non-associated WTRU 440 may stop transmit power ramping 470. The paging WTRU 430 may transmit a specific NCI 475 that includes specific access parameters. The non-associated WTRU 440 may then access one or more of the responding associated WTRUs.

Figure 5:
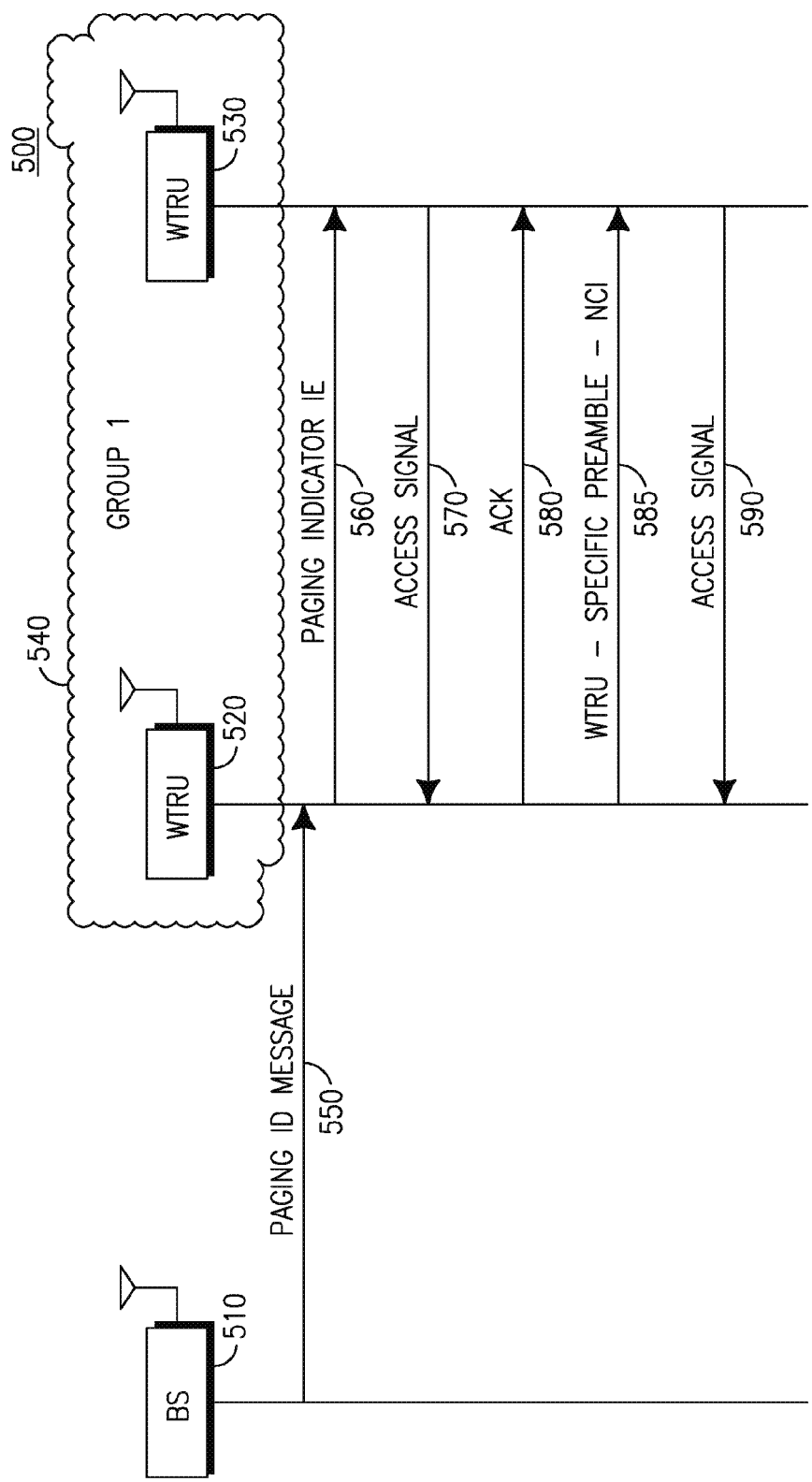
FIG. 5 is a flow diagram of a paging example for a unicast connection.

FIG. 5 is a flow diagram of a paging example 500 for a unicast connection. The cell shown in FIG. 5 includes a BS 510, a WTRU 520, and a WTRU 530. The WTRU 520 may be referred to as a paging WTRU, and the WTRU 530 may be referred to as a paged WTRU. In this example, WTRU 520 and WTRU 530 belong to group 1 540. Group 1 540 is shown with two WTRUs for simplicity, and it is understood that each group may include more than two WTRUs. It is also understood that each cell may include more than one BS.

Referring to FIG. 5, the BS 510 may transmit a paging ID message 550 to one or more WTRUs. In this example, the BS 510 is transmitting the paging ID message 550 to WTRU 520. The paging ID message 550 may include the contents of a paging indication information element (IE). The paging ID message 550 may also include a one or more paged WTRU IDs, one or more paged group IDs, and/or for example, a Synchronized ranging channel (S-RCH) resource indicator. The paging ID message 550 may include an assigned paging indicator (PI) for a single IDLE state WTRU or a group of IDLE state WTRUs. One or more PIs may be assigned to each WTRU. A WTRU in an IDLE state may be assigned a wakeup pattern that may match the preamble or NCI epochs of a discoverable WTRU.

In response to receiving the paging ID message 550, the WTRU 520 may transmit a paging indicator IE 560 to WTRU 530. One or more WTRUs may be instructed to transmit a paging indicator IE 560 that indicates that an associated WTRU or group of WTRUs is paged. The paging indicator IE 560 may be embedded in an NCI message. Alternatively, the NCI message may indicate the resources where a separate paging indicator message (PIM) may be found. The paging indicator IE 560 may include a group preamble, a group NCI, and/or a group paging indicator message, and may be transmitted using a procedure similar to the discovery procedure above.

Each paging indicator or group of paging indicators may have a code group associated with it from which a ranging code may be selected randomly. If this group is distinct from those used for initial network entry, then it may indicate to the paging WTRU that the access is a response to a page. It may also indicate the group to which the paged WTRU belongs.

Since all the members of a discoverable group may transmit the same NCI, they may transmit the same PIM on the same resources, therefore paging the same WTRU. Alternatively, in a group that uses a separate PIM, some discoverable WTRUs may be instructed to omit this message. If the message is omitted, then no other transmission may occur on the same resources.

Referring again to FIG. 5, in response to the paging indicator IE 560, the WTRU 530 may transmit an access signal 570 via an S-RCH resource. The access signal 570 may be a ranging preamble transmitted using a transmit power ramp up procedure. The WTRU 520, in response, may transmit an acknowledgement (ACK) 580 and a WTRU-specific SA-preamble and NCI 585. The WTRU 530 may then transmit an additional access signal 590 and follow the normal cell access procedure.

Figure 6A:
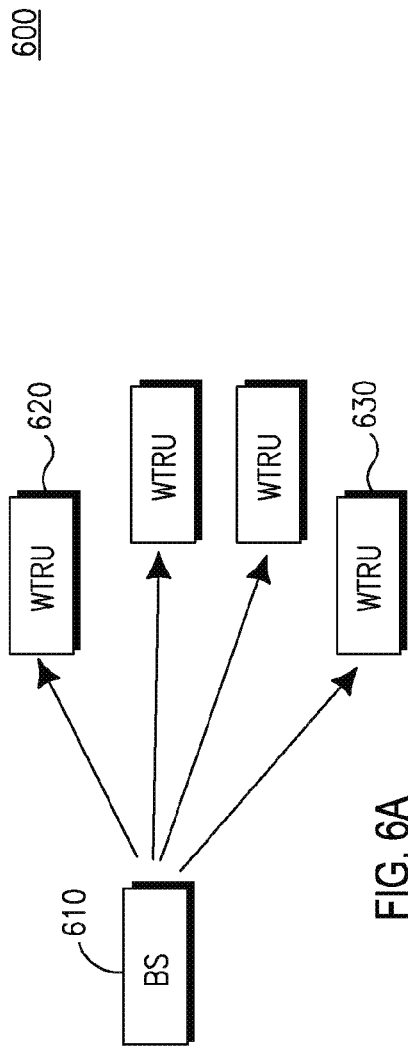
FIGS. 6A and 6B are flow diagrams of another example paging procedure
Figure 6B:
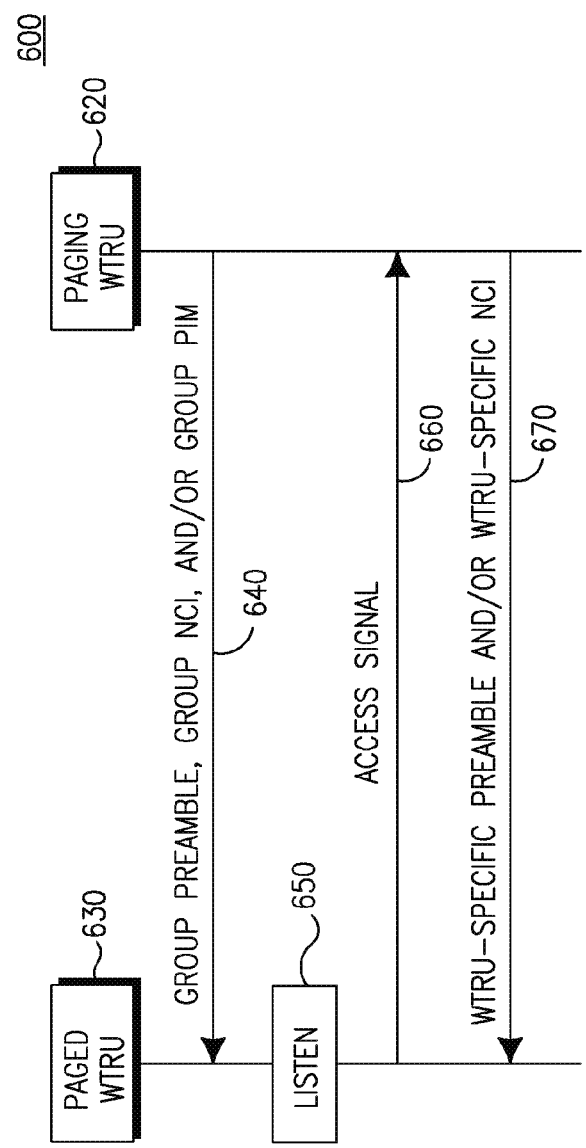

FIGS. 6A and 6B are flow diagrams of another example paging procedure 600. Referring to FIG. 6A, a BS 610 may assign a PI and/or a wakeup pattern to each IDLE state WTRU 620, 630 in the cell. The PI may refer to a single WTRU or a group of WTRUs. One or more PIs may be assigned to each WTRU. The assigned wakeup patterns may match the preamble and/or NCI epochs of a discoverable WTRU. The PI may also indicate that a WTRU is designated as a paging WTRU.

Referring to FIG. 6B, WTRU 620 may be designated as a paging WTRU. The paging WTRU 620 may transmit a group preamble, a group NCI, and/or a group PIM 640 to the paged WTRU 630. The paging WTRU 620 may use a distinct code group to limit the number of WTRU responses. The paged WTRU 630 may be in an idle state, and may listen 650 for paging information embedded in the NCI or PIM. If the paged WTRU 630 receives a paging indicator that was assigned to it, the paged WTRU 630 may transmit an access signal 660 for network entry. If a code group is associated with the PIM, the paged WTRU 630 may select a code from the associated code group. In response, the paging WTRU 620 may transmit a preamble associated with a WTRU (WTRU-specific preamble) and NCI 670 to the paged WTRU 630.

Paging indicators may be included in the WTRU-specific NCI. In addition, if a PIM is used, paging indicators may be added to the PIM. The paging indicators may include an ID associated with a WTRU that indicates, to a paging WTRU, which WTRU to page. Each paging indicator may include one or more IDs associated with one or more WTRUs, respectively. The paging indicators may also belong to a group or may be specific to a paged WTRU. The paging indicators may be different than those used in the preliminary stage. Any ID that may have been assigned to a WTRU when it was previously connected and retained by the network may be used as a paging ID. An idle state WTRU may see a paging indicator assigned to it and continue the network access procedure, including its ID in the access message as normally used when answering a page.

Figure 7:
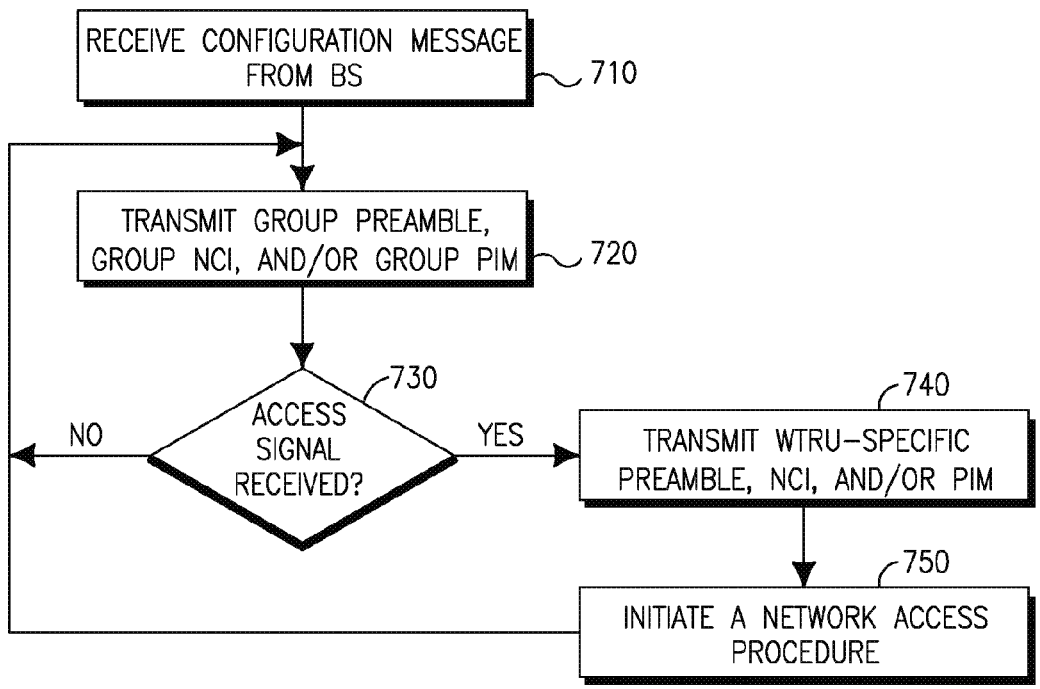
FIG. 7 is a diagram of an example paging method for use in a WTRU.

FIG. 7 is a diagram of an example paging method 700 for use in a WTRU. The WTRU may receive a configuration message 710 from the BS indicating that the WTRU is designated as a paging WTRU. The paging WTRU may transmit a group preamble, a group NCI, and/or a group PIM 720. The paging WTRU may listen for an access signal 730. If an access signal is received, the paging WTRU may transmit a WTRU-specific preamble, NCI, and/or a PIM 740. The paging WTRU may then initiate a network access procedure 750 and continue to transmit a group preamble, a group NCI, and/or a group PIM 720. If an access signal is not received, the paging WTRU may continue to transmit a group preamble, a group NCI, and/or a group PIM 720.

The examples above may allow increased flexibility in the paging process. For example, discoverable WTRUs may be grouped by a combination of their service characteristics and rough geographical location in the cell, such as groups that correspond to a contiguous fraction of a cell area. As a result, the BS may base the size of the paging area in the cell based on its uncertainty regarding the location of the paged WTRU.

The paged WTRUs may be grouped based on one or a combination of their service characteristics and location. For example, all the WTRUs that provide a certain service may belong to a group and may be paged so that they may receive a message. How the location information is used may be determined by the BS. If the WTRU density is below a threshold, the whole group in a certain geographical area may be polled. Otherwise, if the density is over a threshold, then sub-groups may be set up such that the paged WTRUs are dispersed throughout the cell to prevent overloading forwarding WTRUs with access attempts.

A two-stage procedure may be used with different paging groups. This two-stage procedure may be used in conjunction with code use to prioritize between accesses from different code groups.

FIG. 8 is a diagram of another example group paging method 800. The wireless communication system shown in FIG. 8 includes a plurality of WTRUs associated with a BS, and a non-associated WTRU, WTRU G 810. The BS is not shown for simplicity. Of the associated WTRUs, WTRU A 801, WTRU B 803, and WTRU C 805 belong to a first group, for example, Group 1, and WTRU D 802, WTRU E 804, and WTRU F 806 belong to a second group, for example, Group 2.

Referring to FIG. 8, the WTRUs that belong to Group 1 may each transmit a PA-preamble 821, an SA-preamble 823, and an NCI 825. The SA-preamble 823 may include a group ID 827 that indicates which group the WTRU belongs, for example, Group 1. The group ID 827 may be based on service characteristics. The NCI 825 may include paging indicators 829, or indicate where a separate paging indicator may be transmitted, for example, the paging indicator may be transmitted in a separate message. The NCI 825 may also be group-based and include a group ID.

The WTRUs that belong to Group 2 may each transmit a PA-preamble 831, an SA-preamble 833, and an NCI 835. The SA-preamble 833 may include a group ID 837 that indicates which group the WTRU belongs, for example, Group 2. The group ID 837 may be based on service characteristics. The NCI 835 may include paging indicators 839, or indicate where a separate paging indicator may be transmitted, for example, the paging indicator may be transmitted in a separate message. The NCI 835 may also be group-based and include a group ID.

The non-associated WTRU, WTRU G 810, may detect one or more of its paging indicators and transmit a ranging preamble 840 to a group of its choice, for example, Group 2. The one or more paging indicators may have been assigned by a BS at an earlier time via a configuration message. The ranging preamble 840 may include an indicator 845 or a field that indicates the chosen group. In this example, the chosen group may be Group 2. WTRU G 810 may continue to transmit the ranging preamble 840 using a transmit power ramp up procedure until a response is received. Due to the transmit power ramping, associated WTRUs that are nearby may tend to respond first.

In this example, WTRU E 804 and WTRU F 806 may respond first with a group-based acknowledgement (ACK) 850 that may include an indicator 852 that indicates the WTRU group, for example, Group 2. The group-based ACK 850 may be followed by a PA preamble associated with a WTRU (WTRU-specific PA-preamble) 851, 853, an SA-preamble associated with a WTRU (WTRU-specific SA-preamble) 854, 856, and an NCI associated with a WTRU (WTRU-specific NCI) 855, 857. The WTRU-specific SA preamble 854, 856 may include an indicator that indicates a WTRU ID 861, 863, for example, WTRUs E and F, respectively. The WTRU-specific NCI 855, 857 may include an indicator that indicates a WTRU ID 862, 864, for example, WTRUs E and F, respectively.

The non-associated WTRU G 810 may transmit a new network access signal 870, for example a ranging preamble. The network access signal 870 may be transmitted on resources determined from the NCI 857, and may include an indicator 875 that indicates the chosen WTRU ID 864. At this point, a normal access procedure may be followed.

The examples shown in FIGS. 5-8 may be modified to indicate the start or availability of a multicast transmission. In this multi-point paging procedure, the paging indicators may be mapped to multicast channel descriptors. The mapping may be established during a previous connected state. The paging indicators may be embedded in the NCI or a separate message indicated by the NCI. Alternatively, the multicast channel descriptors may be explicitly transmitted and may be either embedded in an NCI or in a separate message. A WTRU that receives a paging indicator for its multicast service or multicast channel descriptors may begin receiving multicast transmission.

In some cases, the number of paged and paging WTRUs may be low, and the latency requirements may be tight. To accommodate these cases, the examples in FIGS. 5-8 may be adapted to perform single point paging. In an example single point paging procedure, the discoverable WTRU may transmit locally individual preambles and NCI. A non-associated WTRU may access an associated WTRU using signaled ranging parameters. This may be a single stage approach similar to BS access by a WTRU. The NCI and PIM messages may be used to indicate paging in this example.

An example transmission of NCI may include PIM transmission. In this example, NCI partitioning may be performed. The NCI may be divided into two subpackets, for example, an Initial Network Configuration Information (I-NCI) and a Supplemental Network Configuration Information (S-NCI).

The I-NCI may be transmitted first, with its location determinable from the SA-preamble index, (Idx), and subcarrier set index, (n) of the SA-preamble transmitted by the forwarding WTRU. An example of the content of the I-NCI is shown in Table 1. An example of the content of the S-NCI is shown in Table 2. The location of the S-NCI may be specified in the I-NCI.

TABLE 1

Example for I-NCI contents and format

| Syntax | Size (bits) | Notes |
| --- | --- | --- |
| BS IDcell | 10 | |
| Frame Configuration Index | 6 | The mapping between value of this index and frame configuration is listed in Table 806, Table 807, and Table 808 |
| If (WirelessMAN-OFDMA with FDM-based UL PUSC Zone Support){ | | True if Frame configuration index is equal to 5, 7, 9, 11, 13, 15, 20, 21, 22, 23, 24, 25, 26, 27, 28, 29 or 30 for 5/10 MHz channel bandwidth according to Table 806; 4, 6, 8 or 10 for 8.75 MHz channel bandwidth according to Table 807; 3 or 5 (with CP = 1/8) for 7 MHz channel bandwidth according to Table 808. False if Frame configuration index is something else |
| UL_Permbase | 7 | May indicate UL_Permbase used in WirelessMAN-OFDMA system with FDM-based UL PUSC Zone. |
| Reserved | for example, 1 to round up to integer bytes | |
| }else{ | | |
| USAC | 5/4/3 | May indicate the number of subbands $K_{SB}$ For 2048 FFT size, 5 bits For 1024 FFT size, 4 bits For 512 FFT size, 3 bits |
| UFPC | 4/3/3 | May indicate the frequency partition configuration For 2048 FFT size, 4 bits For 1024 FFT size, 3 bits For 512 FFT size, 3 bits |
| UFPSC | 3/2/1 | May indicate the number of subbands allocated to FPi (i > 0) in 16.3.7.2.3 For 2048 FFT size, 3 bits For 1024 FFT size, 2 bits For 512 FFT size, 1 bits |
| $UCAS_{SB0}$ | 5/4/3 | May indicate the number of subband-based CRUs in FP0 in 16.3.7.3.1 For 2048 FFT size, 5 bits For 1024 FFT size, 4 bits For 512 FFT size, 3 bits |
| $UCAS_{MB0}$ | 5/4/3 | May indicate the number of miniband-based CRUs in FP0 in 16.3.7.3.1 For 2048 FFT size, 5 bits For 1024 FFT size, 4 bits For 512 FFT size, 3 bits |
| Resource Index for S-NCI | for example, 6 | |
| Reserved | rounding to integer bytes, for example | |
| } | | |

TABLE 2

| Syntax | Size (bits) | Notes |
| --- | --- | --- |
| If (Support of WirelessMANOFDMA with FDM-based UL PUSC Zone){ | | |
| Subframe offset of the RCH | 2 | May indicate the subframe offset ($O_{SF}$) of the RCH allocation. The range of values may be $0 \leq O_{SF} \leq 3$ |
| Start RP code information of the RCH | 4 | May indicate the $k_{ns}$, which may be the parameter for start of the RP code group ($r_{ns0}$). $r_{ns0}(k_{ns}) = 16 \times k_{ns} + 1$, $k_{ns} = 0, 1, \ldots, 15$ |
| Number of RP codes allocated for coverage extension ranging }else{ | 2 | May indicate the number of RP codes and the particular codes that may be used for ranging with the forwarding WTRU. |
| Subframe offset of the S-RCH | 2 | May indicate the subframe offset ($O_{SF}$) of the S-RCH allocation |
| Start RP code information of the S-RCH | | May indicate the ks that may be the parameter controlling the start root index of the RP codes ($r_{s0}$). $r_{s0} = 6 \times k_s + 1$ The range of values may be $0 \leq k_s \leq 15$ |
| Transmission timing offset of SRCH | 3 | Indicates $N_{RTO}$, which may be the parameter used for the calculation of the sample number, $T_{RTO}$, which may be applied to advance the ranging signal transmission timing relative to the defined uplink transmission timing point based on the frame structure from WTRU perspective when WTRU conducts initial or handover ranging in a femtocell. $T_{RTO} = \text{floor}(N_{RTO} \times (T_g - 2) \times FS)$(samples) where $N_{RTO} = \min(RTD/(T_g - 2), 7)$, and RTD may be the round trip delay from the femto-BS to the overlay macro-BS. The range of values is $0 \leq N_{RTO} \leq 7$. |
| } | | |
| UCASi | 3/2/1 | May Indicate the number of total allocated CRUs, in a unit of a subband, for FPi ($i \geq 0$) in 16.3.7.3.1 For 2048 FFT size, 3 bits For 1024 FFT size, 2 bits For 512 FFT size, 1 bits |
| Forwarding EIRP | 5 | Unsigned integer from 1 to 31 in units of 1 dBm, where 0b00000 = 1 dBm and 0b11111 = 31 dBm. |
| WTRU Transmit Power Limitation Level | 5 | Unsigned 5-bit integer. May specify the maximum allowed WTRU transmit power. Values may indicate power levels in 1 dB steps starting from 0 dBm. |
| EIRxPIR,min | 5 | Unsigned integer from −133 to −102 in units of 1 dBm, where 0b00000 = −133 dBm and 0b11111 = −102 dBm. |
| Pre-access S-NCI Indicator | 1 | May indicate whether this is a pre-access S-NCI that may be used for Group Discovery mode 0b0: not a pre-access S-NCI 0b1: pre-access S-NCI |
| Resource Index for PIM | for example, 6 | |

The I-NCI may be transmitted in the NI-NCI Distributed Logical Resource Units (DLRUs) in the first subframe of a superframe. The particular resource index may be determinable from the SA-preamble transmitted by the forwarding WTRU. Within the selected subframe, the I-NCI may occupy the last 5 OFDM symbols, therefore effectively forming a Type-3 subframe.

An resource allocation for the S-NCI may be defined in the I-NCI, as shown in Table 1, and the allocation may depend on the IDCell and the frame configuration of the serving BS/RS. Paging indicators may be included in the I-NCI, the S-NCI, or in a separate PIM message. The location of the PIM may be indicated in the I-NCI or in the S-NCI. Tables 1 and 2 show an example in which the location is advertised in the S-NCI. In this example, specific code groups may be assigned to each PI.

Table 3 illustrates an example format for a PIM message.

TABLE 3

Contents and format for PIM

| Syntax | Size (bits) | Notes |
| --- | --- | --- |
| N_PI | for example, 8 | May indicate the number of distinct paging indicators in this message |
| For (i=0; i<N_PI; i++) { | | |
| PI | for example, 16 | Paging indicator |
| Start RP code information of the S-RCH | 4 | May indicate the $k_s$ that may be the parameter controlling the start root index of the RP codes ($r_{s0}$). $r_{s0} = 6 \times k_s + 1$ The range of values may be $0 \leq k_s \leq 15$ |
| } | | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a receiver configured to:
     receive a preamble from at least one second WTRU that indicates a group identification (ID) associated with the at least one second WTRU, and
     receive, from the at least one second WTRU, a first message that includes network connection information (NCI) and a second message that includes a paging indicator (PI); and
   a transmitter configured to, on a condition that the received PI includes an ID associated with the WTRU, transmit a ranging preamble to the at least one second WTRU, wherein the ranging preamble includes a group ID associated with the at least one second WTRU.

2. The WTRU of claim 1, wherein the preamble is a secondary advanced (SA)-preamble.

3. The WTRU of claim 1, wherein the receiver is further configured to receive a configuration message that indicates the PI associated with the WTRU.

4. The WTRU of claim 1, wherein the transmitter is further configured to transmit the ranging preamble using a transmit power ramping procedure.

5. The WTRU of claim 1, wherein the receiver is further configured to receive a second NCI message from the at least one second WTRU, wherein the second NCI message includes a WTRU ID associated with a transmitting WTRU.

6. The WTRU of claim 5, wherein the transmitter is further configured to transmit, to the WTRU associated with the WTRU ID, a second ranging preamble in response to the received second NCI message.

7. The WTRU of claim 6, wherein the second ranging preamble indicates the WTRU ID associated with the transmitting WTRU.

8. A method for use in a wireless transmit/receive unit (WTRU), the method comprising:
   receiving a preamble from at least one second WTRU that indicates a group identification (ID) associated with the at least one second WTRU;
   receiving a first message from the at least one second WTRU that includes network connection information (NCI);
   receiving a second message from the at least one second WTRU that includes a paging indicator (PI); and
   transmitting, on a condition that the received PI includes an ID associated with the WTRU, a ranging preamble to the at least one second WTRU, wherein the ranging preamble includes a group ID associated with the at least one second WTRU.

9. The method of claim 8, wherein the preamble is a secondary advanced (SA)-preamble.

10. The method of claim 8 further comprising:
    receiving a configuration message that indicates the PI associated with the WTRU.

11. The method of claim 8, wherein the ranging preamble is transmitted using a transmit power ramping procedure.

12. The method of claim 8 further comprising:
    receiving a second NCI message from the at least one second WTRU, wherein the second NCI message includes a WTRU ID associated with a transmitting WTRU.

13. The method of claim 12 further comprising:
    transmitting, to the WTRU associated with the WTRU ID, a second ranging preamble in response to receiving the second NCI message.

14. The method of claim 13, wherein the second ranging preamble indicates the WTRU ID associated with the transmitting WTRU.

15. A wireless transmit/receive unit (WTRU) comprising:
    a transmitter configured to:
      transmit a preamble that indicates a group identification (ID) associated with the WTRU;
      transmit a first message that includes network connection information (NCI); and
      transmit a second message that includes a paging indicator (PI); and a receiver configured to receive a ranging preamble, wherein the ranging preamble includes a group ID associated with the WTRU.

16. The WTRU of claim 15, wherein the preamble is a secondary advanced (SA)-preamble.

17. The WTRU of claim 15, wherein the transmitter is further configured to transmit a second NCI message, wherein the second NCI message includes a WTRU ID associated with the WTRU.

18. The WTRU of claim 17, wherein the receiver is further configured to receive a second ranging preamble in response to the second NCI message.

19. The WTRU of claim 18, wherein the second ranging preamble indicates the WTRU ID associated with the WTRU.

* * * * *